Figure 1:
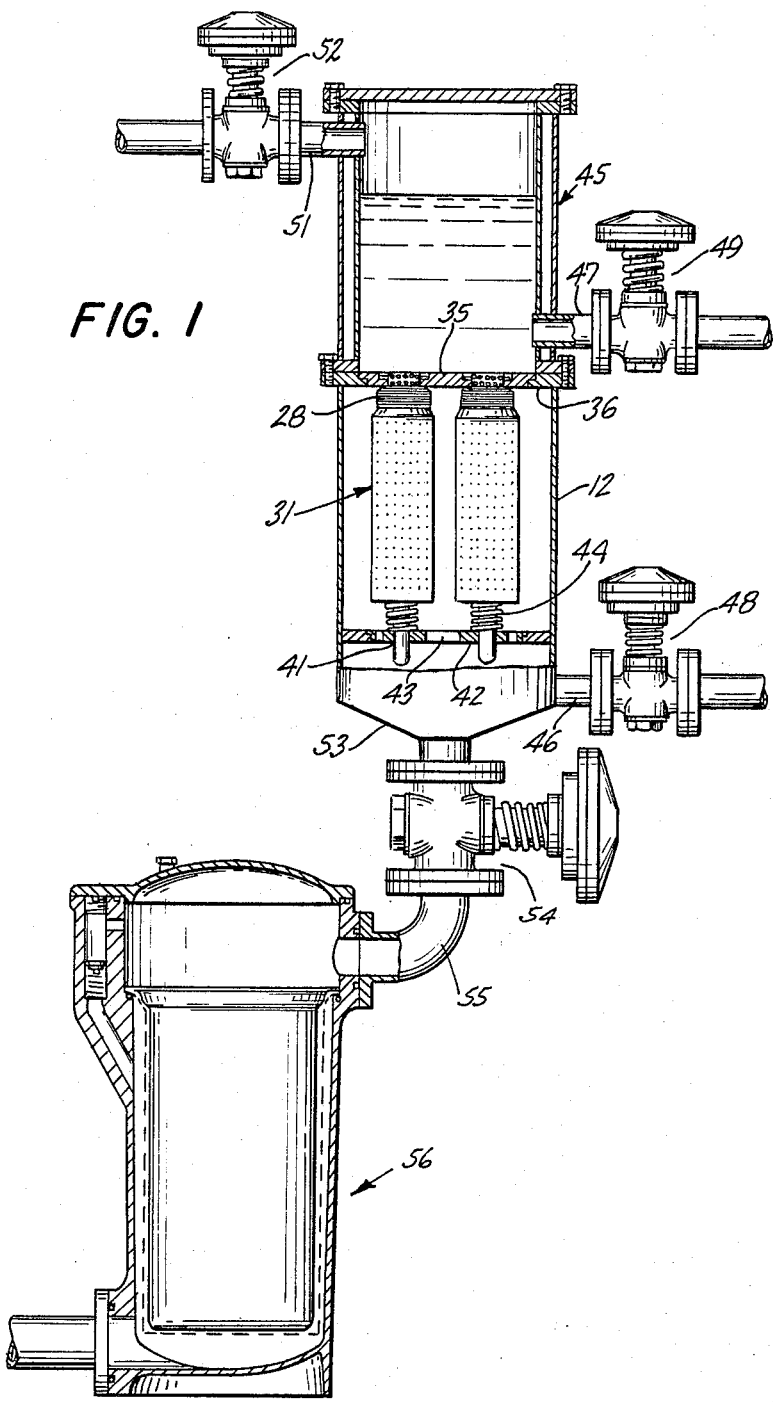

INVENTOR.
JACQUES MULLER

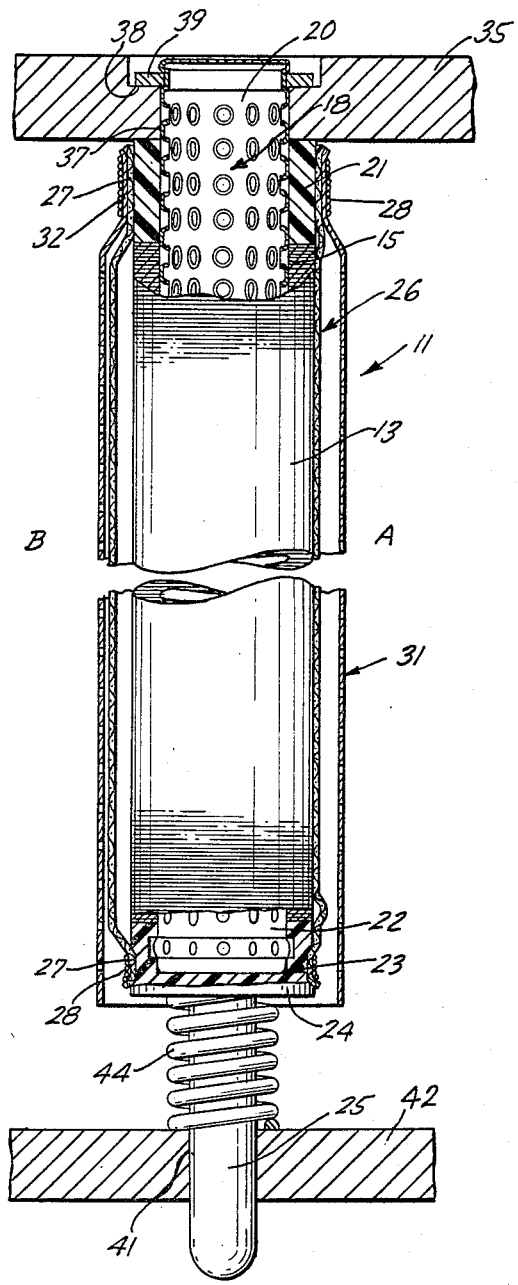
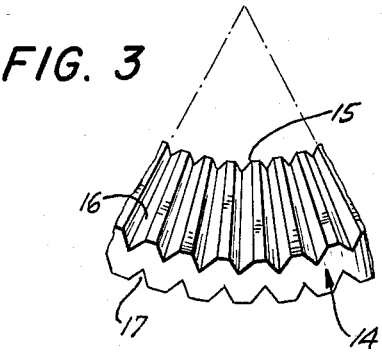
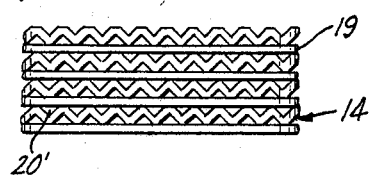
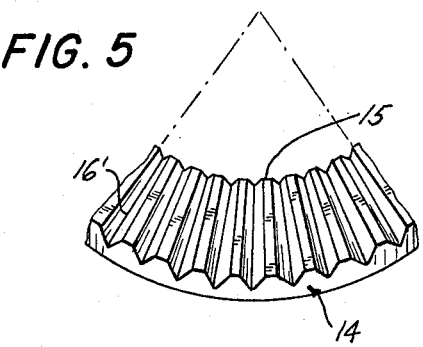

United States Patent Office 3,285,420
Patented Nov. 15, 1966

3,285,420
FILTERING EQUIPMENT
Jacques Muller, La Garenne-Colombes, France, assignor to Rellumit Inter, S.a.r.L., La Garenne-Colombes, France, a corporation of France
Filed Oct. 15, 1963, Ser. No. 316,348
1 Claim. (Cl. 210—262)

This application is a continuation-in-part of copending application Serial No. 311,761, filed September 26, 1963, for Filtering Equipment for Fluids and copending application Serial No. 287,346, filed 12, 1963, and now U. S. Patent No. 3,214,386.

This invention relates to the art of filtering elements, more particularly of the stacked disc type.

As conductive to an understanding of the invention, it is noted that where filtering equipment is provided such as the type shown in said copending application Serial No. 287,346, which utilizes porous columns of the type shown and described in said application, to filter impurities from either gaseous or liquid fluids of all densities, it is desirable to provide a pre-filtering action before the fluid reaches the filter column in order to remove larger size particles that might quickly clog the filter.

More particularly where the filter column is formed from a stack of discs or washers each having a central opening defining an axial bore through the column, with at least one of the surfaces of the disc having substantially radially extending grooves of millimetric, centimillimetric or micrometric dimensions, by reason of the relatively small size of the openings defined by the outer ends of the grooves, where the particles or impurities being filtered are relatively large they will quickly tend to clog the inlets to the grooves.

It is accordingly among the objects of the invention to provide a filtering element which incorporates a filter column of the above type and which will dependably restrain passage to the filtering column of large size particles or impurities thereby providing a pre-filtering action which may readily and automatically be cleaned without need for disassembly of the equipment for such purpose.

According to the invention these objects are accomplished by the arrangement and combination of elements hereinafter described and more particularly recited in the claim.

In the accompanying drawings in which are shown one or more of various possible embodiments of the several features of the invention:

FIG. 1 is a longitudinal sectional view of a filtering equipment incorporating the filtering element which is the subject of the present invention.

FIG. 2 is a longitudinal view partly in section and with parts broken away showing one embodiment of the invention, one side of FIG. 2 showing the filter element during filtration and the other side during cleaning, FIG. 3 is a diagrammatic fragmentary perspective view showing a filter disc with grooves on both faces thereof, FIG. 4 is a diagrammatic fragmentary side elevational view of a stack of discs having alternately smooth and grooved discs of the type shown in FIG. 3.

FIG. 5 is a view similar to FIG. 3 of a disc with grooves on one face thereof, and FIG. 6 is a view similar to FIG. 4 of a stack of discs of the type shown in FIG. 5.

Referring now to the drawings, the filter element 11 which is the subject of this invention, is illustratively shown incorporated in filter equipment of the type shown in FIG. 1 which is designed to separate impurities from liquid fluids of all densities.

The filter equipment comprises a housing 12 in which is supported a plurality of stacks 13 of filter members, each illustratively formed from a plurality of juxtaposed discs or washers 14 having relatively small cross section grooves in the surface thereof.

The idscs 14 may be of the type shown in FIGS. 3 and 5 if desired and assembled as shown in FIGS. 4 and 6.

Thus, each of the discs 14 has a central opening 15 and has substantially radially extending grooves 16, 17 in both surfaces, thereof as shown in FIG. 3, or grooves 16' in one surface thereof as shown in FIG. 5, each of the grooves in cross section illustratively being in the form of an equilateral triangle.

More particularly, as more fully described in said copending application Serial No. 287,346, each of the discs 14 is of imprevious material such as a suitable plastic and the grooves are deeper at the inner end thereof which is in communication with the central opening 15 than at the outer periphery of the disc and are of increasing section from the outside to the inside.

The discs 14 are assembled on a rigid perforated guide tube 18 as shown in FIG. 2 which extends through the openings 15 of the discs. Where the discs 14 are of the type shown in FIG. 3 with the grooves 16, 17 on both surfaces thereof, it is preferred to interpose a smooth surface ring member 19 between adjacent discs so that the ends of the grooves which define the inlets or openings 20' in the periphery of the stack will not be enlarged.

Encompassing each guide tube 18 near one end 20 thereof is a sleeve 21 preferably of rigid plastic material and of outer diameter substantially the same as that of the discs 14. Encompassing the other end 22 of the tube 18 is a rigid cup-shaped member 23 also preferably of plastic material which has a floor 24 from which extends an axial guide rod 25.

Encompassing the filtering column 13 formed by the stack of juxtaposed discs 14 is a filter sleeve 26 made of deformable and extensible mesh or of a porous plastic material.

The sleeve 26 is of diameter greater than that of the stack or column 13 and has its ends 27 secured to the sleeve 21 and member 23 respectively by any suitable clamping means 28 such as a readily releasable clamping band.

In addition, a guard sleeve 31 of rigid material encompasses the filter sleeve 26, said guard sleeve being a perforated tube or a wire mesh tube, for example, which has one end 32 secured to sleeve 21 by the associated clamping means 28.

The filter sleeve 26 when snugly gripping the column 13 defined by the juxtaposed discs 14 as shown at A on the right side of FIG. 2, will have its openings or pores of size such as to restrain passage therethrough of relatively large particles entrained with the fluid being filtered, thereby providing a pre-filtration action.

When the filter sleeve is extended to the position shown at B on the left side of FIG. 2, the pores or openings in sleeve 26 will be of much greater size for the purpose hereinafter set forth, the guard sleeve 31 limiting the extension of filter sleeve 26 to prevent rupture thereof.

As illustratively shown in FIGS. 1 and 2, each of the filtering elements is arranged so as to depend vertically from a supporting plate 35 which extends transversely across the housing 12 and is seated on an annular support 36 secured to the mouth of said housing 12.

More particularly, the plate 35 has a plurality of openings 37 each of enlarged diameter at its upper end defining an annular shoulder 38. The end 20 of tube 18 which defines the outlet of the filtering element, extends through said opening and is releasably retained therein as by a snap ring clamp 39, for example, encompassing an annular groove in the end 20.

Each of the filtering elements 13 is retained in vertical position by means of its associated guide rod 25 which extends through a suitable opening 41 in a plate 42 extending transversely across the housing 12 near the lower end thereof, said plate having a plurality of relatively large passages 43 therethrough.

As shown in FIGS. 1 and 2, a coil spring 44 encompasses each of said rods 25 and reacts against the floor 24 of member 23 to retain the washers 14 in tightly clamped juxtaposed position.

The housing 12 has a tank 45 mounted thereon above plate 35 into which the open ends of the tubes 18 lead.

An inlet pipe 46 for the unfiltered fluid leads into the lower end of the housing 12, and an outlet pipe 47 leads into the lower end of tank 45, valves 48, 49 controlling said pipes 46, 47 respectively.

Leading into the upper end of tank 45 is a pipe 51 which is connected through valve 52 to a source of compressed air.

The lower end of housing 12 is funnel shaped as at 53 and said funnel shaped portion has an outlet connected through valve 54 and pipe 55 to the inlet of a collector tank 56 which may be of the type shown in said copending application Serial No. 311,761, In the operation of the equipment the valves 52, 54 are set to closed position and valves 48, 49 are opened. As a result, the non-filtered fluid, which is under pressure, will flow through open valve 48 and pipe 46 into the lower end of housing 12 and pass upwardly through the passageways 43 in plate 42. The fluid under pressure will press the filter sleeves 26 against the guide tubes 18 as shown at A in FIG. 2, thereby reducing the openings or pores in the filter sleeve to a size such that will prevent passage therethrough of particles or impurities beyond a predetermined size, but permit flow of the fluid and the smaller size particles.

Thus, the filter sleeve 26 provides a pre-filtration action prior to the filtering action of the filter columns 13.

As the pre-filtered fluid is forced through the inlets 20' to the grooves, the particles in suspension in the fluid will be restrained by reason of the dimensions of the grooves in each of the discs defining the column, from passing through the discs, as more fully described in said copending application Serial No. 287,346.

As a result, the filtered fluid passing through the columns 13 will flow upwardly through the perforated tube 18 into tank 45 and be discharged through pipe 47 and open valve 49.

When the number of particles restrained by the filter sleeve 26 and the filter columns 13 becomes excessive and clogs, the filter sleeve 26 and the filter columns 13, the flow of clean fluid will diminish and possibly stop.

As the fluid forced into casing 12 is under pressure, in the event it cannot flow readily through the filtering columns 13, the pressure in housing 12 will build up.

When such pressure exceeds a predetermined amount, a suitable pressure responsive device (not shown) will automatically be actuated or a pressure responsive alarm (not shown) may be actuated.

If an audible alarm is provided, the operator will then manually close valves 48 and 49 and open valves 52 and 54. If an automatic device is provided, when the latter is actuated it will complete an electric circuit to suitable solenoids controlling valves 48, 49, 52, 54 to open valves 52, 54 and close valves 48, 49.

As a result of the closing of valves 48, 49, the fluid inlet and outlet will be closed. As a result of the opening of valves 52, 54, compressed air will be forced into tank 45 from pipe 51 and will force the fluid in tank 46 through the ends 20 of each of the columns 13 through the perforated tube 18 and thence outwardly through the grooves 16, 17 in the juxtaposed discs 14 forming the columns 13.

As the result of such back flow, particles that have obstructed or clogged the inlet 20' to each of the grooves which is at the outer periphery of the discs, will be dislodged. By reason of the outward flow of fluid from the columns 13, the filter sleeves 26 will be forced outwardly as shown at B in FIG. 2, thereby enlarging the openings or pores therein so that the particles dislodged from the inlets of the grooves will flow through the filter sleeve and the particles on the outer surface of said sleeve will be dislodged also. The fluid with the entrained particles will be forced by the back flow through the openings in the guard sleeve 31 and be carried downwardly to the bottom of the casing 12 and such fluid will also be forced downwardly to the bottom of the casing 12 between the space between the guard sleeve 31 and filter sleeve 26. The fluid will then be discharged through open valve 54 into collecting container 56.

After the filter columns 13 and the filter sleeves 26 are cleaned as above described, valves 52, 54 may be closed manually and valves 48, 49 opened manually or if a pressure responsive device is employed, it will be actuated automatically when the pressure in housing 12 drops below said predetermined amount after the filters have been cleaned so that the equipment can again operate in usual manner.

It is apparent with the construction above described, effective cleaning of the filter units may be accomplished in a relatively short period of time without need for disassembly of the equipment, so that normal filtering action can be resumed almost immediately after clogging occurs with resultant high efficiency of the equipment.

By the use of the filter sleeves 26, a pre-filtration is provided which eliminates the presence of larger particles which would more quickly obstruct the relatively small inlets 20' to the grooves. In addition, it is within the scope of the invention to employ a plurality of concentric filter sleeves with progressive size openings or pores in order to obtain finer filtration.

It is also within the scope of the invention to reverse the flow direction so that it is from the interior of the columns 13 outwardly, in which case filter sleeves and associated guard sleeves would be provided in the bore of the column.

As many changes could be made in the above construction, and many apparently widely different embodiments of this invention could be made without departing from the scope of the claim, it is intended that all matter contained in the above description or shown in the accompanying drawings shall be interpreted as illustrative and not in a limiting sense.

Having thus described my invention what I claim as new and desire to secure by Letters Patent of the United States is:

Equipment for filtering particles from fluids, comprising a container having an inlet adjacent its lower end for unfiltered fluids, and an outlet at its lower end, a first chamber positioned above the container to receive filtered fluid, said chamber having an outlet, a first pair of valves controlling said container inlet and chamber outlet respectively, said container having a pair of spaced transverse walls, one of said walls being adjacent said first chamber, said walls having aligned openings, a filter column in said container having a central bore, said filter column comprising a plurality of stacked discs of impervious material each having a central opening defining the bore of said column, each of said discs being provided on at least one surface with substantially radial grooves extending from the outer periphery thereof to the central opening, each of said grooves being of a width to permit flow of fluid therethrough but to restrain passage of such particles, a perforated guide tube extending through the bore of said column defined by the central openings in said discs, one end of said tube extending into the opening in said one wall, a sleeve encompassing said tube beneath said one wall, a cup shaped member encompassing the other end of said tube and having an axial rod extending through the aligned opening in said other wall, a coil spring encompassing said rod and compressed between said other wall and said cup shaped member and resiliently retaining said discs in juxtaposed position, a filter sleeve of porous material encompassing said filter column, said filter sleeve being secured at its ends to said tube sleeve and said cup shaped member respectively, and being normally of diameter greater than that of said filter column, the pore size of said filter sleeve being reduced when said filter sleeve snugly engages said filter column, a valve controlling said container outlet, a particle collecting chamber beneath said container, said other transverse wall having passage means therethrough to provide communication between said container and said particle collecting chamber, through said container outlet, and valve controlled means to apply gas under pressure to react against the contents of said first chamber, whereby in normal operation of said equipment with said first pair of valves in open position and said container outlet valve and said valve controlled means in closed position, fluid forced under pressure into said container will be filtered by said filter column and filter sleeve and the filtered fluid will be discharged through said first chamber outlet and with said first pair of valves in closed position and said container outlet valve and said valve controlled means in open position, the gas under pressure reacting against the contents of said first chamber will force the fluid in said first chamber in reverse direction through said filter column and said filter sleeve to dislodge the particles clogging the outer surfaces thereof for discharge through said open container outlet valve into said collecting chamber.

References Cited by the Examiner

UNITED STATES PATENTS

| | | | |
|---|---|---|---|
| 1,288,508 | 12/1918 | Chapin | 210—323 |
| 1,796,613 | 3/1931 | Nugent | 210—323 |
| 2,702,637 | 2/1955 | Shepard | 210—492 |
| 2,767,851 | 10/1956 | Muller | 210—323 X |
| 2,862,622 | 12/1958 | Kircher et al. | 210—82 X |
| 3,089,325 | 5/1963 | Robbins et al. | 210—333 X |
| 3,100,190 | 8/1963 | Hobson | 210—356 X |
| 3,111,963 | 11/1963 | Brockwell | 210—492 X |
| 3,195,730 | 7/1965 | Muller | 210—497 X |

REUBEN FRIEDMAN, *Primary Examiner.*

J. DE CESARE, *Assistant Examiner.*